Patented Sept. 19, 1939

2,173,506

UNITED STATES PATENT OFFICE 2,173,506

VAT DYE COMPOSITIONS

John Elton Cole, Wilmington, Del., assignor to E. I. du Pont de Nemours & Company, Wilmington, Del., a corporation of Delaware No Drawing. Application July 17, 1937, Serial No. 154,193

8 Claims. (Cl. 260—331)

The present invention relates to the manufacture of dyestuff pastes and powders. More particularly it relates to the manufacture of dyestuff pastes and powders for use in textile printing. Still more particularly it relates to the preparation of thioindigo dyes which are especially advantageous in rayon printing.

Ever since the discovery of commercial methods for the manufacture of indigo there have been many attempts to control the physical form of vat dyes, especially the indigoid types, in order to obtain optimum working properties. Many attempts have been made to improve the covering power of the dye pigment by precipitating the color in the presence of various wetting and dispersing agents. However, in spite of these attempts it has been found that these precipitated pigments are rather coarse and therefore give rough and dull results when applied by dyeing or printing processes. Attempts have also been made to achieve improved pigment dispersion of these colors by mechanical means such as vigorous milling and disintegration. One difficulty in using such mechanical means is the expense since such milling and disintegrating operations are very expensive. Attempts have also been made to improve the dyeing properties of these colors by mixing the colors with various assistants which tended to give improved color strength on the dyed textile materials. However, in spite of the vast amount of research in this field it has been found that many difficulties, similar to those mentioned above, are still present.

It is an object of the present invention to prepare indigoid colors of superior dyeing and printing strength. A further object is to produce indigoid colors in a finely divided and highly dispersed condition especially suitable for the printing of rayon. A still further object is to produce indigoid colors of superior covering power when used as pigments. Additional objects will become apparent from a consideration of the following description and claims.

These objects are attained according to the herein described invention which broadly comprises oxidizing an indoxyl in the presence of naphthalene sulfonic acid either as the free acid or its alkali salt.

In a more restricted sense the invention comprises dissolving or suspending a thioindoxyl in an alkali solution under which condition the alkali salt of the thioindoxyl is formed which may or may not be completely soluble. To this mixture is added alkylated naphthalene sulfonic acid either as the free acid or its alkali salt. The amount of salt which is added will vary widely although an amount between 0.1 of a gram to 100 grams per 1000 c.c. of solution is generally satisfactory. The temperature is then adjusted at between about 50° C. to 100° C. and an oxidizing agent is added. The dye is then removed by filtration and is standardized.

The preferred embodiment of this invention comprises dissolving or suspending a thioindoxyl in an alkali solution, preferably sodium hydroxide. The alkalinity is preferably between about 0.5% to about 10% of caustic soda. To this mixture is added about 1 gram of a high alkylated naphthalene sulfonic acid sodium salt. The temperature is then adjusted preferably between 70° C. and 80° C. and an oxidizing agent is added. After complete oxidation of the indoxyl, which can be carried out in numerous ways familiar to those skilled in the art, the dye is isolated by filtration and washed free from salts and other soluble materials including the naphthalene sulfonic acid salts. The resulting crude color is preferably standardized by the addition of water and printing assistants, such for example as those described in U. S. P. 2,024,973, 2,024,974 and 2,024,975. Alternatively the crude color can be standardized as a dry powder by the addition of saccharic substances, sulfated alcohols, and various other wetting and dispersing agents.

The oxidizing agents which are used include polysulfide, ferricyanide, Sitol, etc.

The invention may be more readily understood by a consideration of the following examples.

Example 1

100 parts of 4-methyl-6-chlor-thionaphthene, was suspended in 8,500 parts of water containing 250 parts of sodium hydroxide and 10 parts of the sodium salt of isopropylated naphthalene sulfonic acid. This mixture was heated to a temperature of 70° C. and 300 parts of sodium polysulfide ($Na_2S_{4.5}$) as a 40% solution was added. The red dye was completely precipitated after stirring at the above temperature for approximately two hours. It was removed by filtration and washed alkali-free with water. The resulting color cake, which weighed approximately 700 parts was mixed with a small amount of water and 7.5 parts of anthraquinone beta sodium sulfonate. In order to obtain a thin workable paste a small amount of the reaction product of formaldehyde and naphthalene sulfonic acid was added. This color paste (20 parts) was mixed with printing gum (80 parts) and the resulting printing paste was printed on rayon materials. The resulting print was stronger, brighter and smoother than a similar print prepared from color which was manufactured in an exactly similar manner but without the addition of the isopropylated naphthalene sodium sulfonate to the indoxyl solution. The printing gum referred to here contained approximately 12% sodium formaldehyde sulfoxylate, 17% potassium carbonate and 5% glycerine along with sufficient thickeners to give the desired viscosity.

*Example 2*

100 parts of 7-methyl-5-chlor-thionaphthene was suspended in 8,000 parts of water containing 240 parts of NaOH and 10 parts of isopropylated naphthalene sodium sulfonate. This solution was adjusted to a temperature of 70° C. and 300 parts of sodium polysulfide ($Na_2S_{4.5}$) was added. The bluish red dye which began forming immediately was completely precipitated after two hours. It was removed by filtration and finally washed with water. It was standardized to a paste in a manner analogous to that described in Example 1. This color paste gave very superior results, stronger, brighter and smoother prints when printed on rayon than an exactly similar composition prepared from color precipitated in the absence of the isopropylated naphthalene sodium sulfonate.

*Example 3*

In a similar way 6:6'-dichlor-thioindigo was prepared by the oxidation of 6-chlor-thionaphthene in the presence of isopropylated naphthalene sodium sulfonate.

*Example 4*

In a similar way a dyestuff paste was prepared from 6:6'-diethoxy-thioindigo by oxidation of an alkaline solution of 6-ethoxy-thionaphthene in the presence of isopropylated naphthalene sodium sulfonate.

*Example 5*

In a similar way a dyestuff paste was prepared of 5:5'-dichlor-4:4'-7:7'-dimethyl-thioindigo obtained by oxidizing an alkaline solution of 5-chlor-4:7-dimethyl-thionaphthene in the presence of isopropylated naphthene sodium sulfonate.

*Example 6*

Example No. 1 was repeated except that butylated naphthalene sodium sulfonate was substituted for the isopropylated naphthalene sodium sulfonate in the indoxyl solution before oxidation. When this color was used for printing rayon materials the shades obtained were stronger, brighter and smoother than those obtained from color precipitated in an exactly similar way but in the absence of butylated naphthalene sodium sulfonate.

It is to be understood that the aforementioned examples are representative only of the methods of practising the invention. These methods may be subjected to variations and modifications. Thus, this invention can be applied to any of the thioindoxyls which can be precipitated by the oxidation of their indoxyl solution. It can likewise be applied to the corresponding vats of the respective colors but such a use is not preferred for this class of colors since it involves an extra operation and the yields on the vatting operation are generally unsatisfactory. This invention can also be applied to any alkaline solution which upon oxidation will give an insoluble thioindigo. However, the invention is preferably applied to the manufacture of Sulfanthrene Pink FF by oxidation in the presence of Alkanol B.

The amount of naphthalene sulfonic acid salt which is added will vary but generally an amount between 0.1 gram and 100 grams per 1000 cc. and preferably about 1 gram per 1000 cc. is sufficient to obtain the advantageous results.

The alkalinity and temperature also will vary widely. Usually between about 0.5% and 10% caustic soda is sufficient alkalinity. The temperature will vary, depending on the oxidizing agent used as well as the indoxyl. Generally a temperature between 50° C. and 100° C. and preferably between 70° C. and 80° C. is sufficient.

Colors precipitated in the presence of the aforementioned salts and acids are in a very much finer crystal size than those precipitated in its absence. Therefore, it is possible to prepare by means of this invention dyestuff pastes and powders containing very finely divided colors without having to resort to expensive milling and disintegrating operations. By this method it is possible to prepare colors of very high tinctorial value as pigments. Colors prepared in this way are especially suitable for the pigmentation of wallpaper and similar uses which do not depend upon fixation of the dyestuff by a preliminary reduction to its leuco. Furthermore, in textile printing operations these finely precipitated pigments give especially smooth and clear prints when applied by the usual methods of textile printing. This is particularly desirable in the printing of rayon fabrics especially of the pigmented rayon type.

As many apparently widely different embodiments of this invention may be made without departing from the scope and spirit thereof, it is to be understood that the invention is not limited to the specific embodiments except as defined in the appended claims.

Having described the present invention the following is claimed as new and useful:

1. A process for producing a thioindigo of high tinctorial value which comprises oxidizing a thioindoxyl compound in the presence of an isopropyl naphthalene alkali sulfonate.

2. A process for producing a thioindigo of high tinctorial value which comprises oxidizing a thioindoxyl compound in the presence of isopropylated naphthalene sodium sulfonate.

3. A process for producing a thioindigo of high tinctorial value which comprises oxidizing an aqueous alkaline suspension of 4-methyl-6-chlor-thionaphthene in the presence of the sodium salt of isopropylated naphthalene sulfonic acid.

4. A process for producing a thioindigo of high tinctorial value which comprises oxidizing a thioindoxyl compound in the presence of butylated naphthalene alkali sulfonate.

5. A process for producing a thioindigo of high tinctorial value which comprises oxidizing a thioindoxyl compound in the presence of butylated naphthalene sodium sulfonate.

6. A process for producing a thioindigo of high tinctorial value which comprises oxidizing a thioindoxyl compound in the presence of a member selected from the group consisting of isopropyl naphthalene alkali sulfonates and butyl naphthalene alkali sulfonates.

7. A process for producing a thioindigo of high tinctorial value which comprises suspending a thioindoxyl compound in an alkali solution, adding thereto between 0.1 gram and about 100 grams per 1000 cc. of solution of an isopropyl naphthalene alkali sulfonate, and thereafter oxidizing at a temperature between 50° C. and 100° C.

8. A process for producing a thioindigo of high tinctorial value which comprises suspending a thioindoxyl compound in an alkali solution, adding thereto between 0.1 gram and about 100 grams per 1000 cc. of solution of a butylated naphthalene alkali sulfonate, and thereafter oxidizing at a temperature between 50° C. and 100° C.

JOHN ELTON COLE.